United States Patent
Compton et al.

(10) Patent No.: US 8,200,806 B2
(45) Date of Patent: Jun. 12, 2012

(54) AUTOMATED DISCOVERY AND CONFIGURATION OF COMPONENTS ON A COMPUTER NETWORK

(75) Inventors: Matthew C. Compton, Tucson, AZ (US); Andrew G. Hourselt, Tucson, AZ (US); Craig F. Schultz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 11/458,817

(22) Filed: Jul. 20, 2006

(65) Prior Publication Data

US 2008/0021993 A1 Jan. 24, 2008

(51) Int. Cl.
*G06F 15/173* (2006.01)

(52) U.S. Cl. .......... 709/224; 709/223; 370/389

(58) Field of Classification Search .......... 709/223–224; 370/389
See application file for complete search history.

(56) References Cited

U.S. PATENT DOCUMENTS

| | | | | |
|---|---|---|---|---|
| 4,737,953 A * | 4/1988 | Koch et al. | 370/401 |
| 5,321,695 A | 6/1994 | Faulk, Jr. | 370/94.1 |
| 5,337,309 A | 8/1994 | Faulk, Jr. | 370/60 |
| 5,745,488 A | 4/1998 | Thompson et al. | 370/395 |
| 5,854,901 A | 12/1998 | Cole et al. | 395/200.75 |
| 6,269,423 B1 | 7/2001 | Kishi | 711/113 |
| 6,304,880 B1 | 10/2001 | Kishi | 707/200 |
| 6,356,803 B1 | 3/2002 | Goodman et al. | 700/218 |
| 6,434,090 B1 | 8/2002 | Basham et al. | 369/30.31 |
| 6,487,474 B1 | 11/2002 | Goodman et al. | 700/245 |
| 6,549,932 B1 | 4/2003 | McNally et al. | 709/202 |
| 6,598,094 B1 | 7/2003 | Wollrath et al. | 709/330 |
| 6,826,605 B1 | 11/2004 | Mitra | 709/223 |
| 6,981,036 B1 * | 12/2005 | Hamada | 709/223 |
| 7,020,755 B2 | 3/2006 | Gibble et al. | 711/162 |
| 7,035,257 B2 * | 4/2006 | Vafaei | 370/389 |
| 7,143,615 B2 * | 12/2006 | Connor et al. | 70/224 |
| 2004/0264389 A1 * | 12/2004 | Abdo et al. | 370/255 |
| 2005/0125449 A1 | 6/2005 | Wong et al. | 707/104.1 |
| 2005/0125450 A1 | 6/2005 | Wong et al. | 707/104.1 |
| 2005/0125768 A1 | 6/2005 | Wong et al. | 717/100 |

OTHER PUBLICATIONS

Kishi, Gregory T. "The IBM Virtual Tape Server: Making Tape Controllers More Autonomic" *IBM J. Res. & Dev.*, vol. 47, No. 4 ( Jul. 2003).

* cited by examiner

*Primary Examiner* — Ario Etienne
*Assistant Examiner* — Michael C Lai
(74) *Attorney, Agent, or Firm* — Hamilton & Terrile, LLP; Stephen A. Terrile

(57) ABSTRACT

A method for autodiscovery of components on a network without requiring that the components have built-in knowledge of the discovery method is set forth. The method uses a combination of attempting broadcast discovery as well as listening to network traffic. More specifically, a substantially continuously executing program is executed on a management console of the network that performs the broadcast and listening functions. The autodiscovery uses these methods in combination to identify systems that are included within the VTS system.

21 Claims, 4 Drawing Sheets

AUTOMATED DISCOVERY AND CONFIGURATION OF COMPONENTS ON A COMPUTER NETWORK

BACKGROUND OF THE INVENTION

1. Field of the Invention

The invention relates in general to computer networks and more particularly to discovering components on computer networks such as a server, storage subsystem or tape storage subsystem.

2. Description of the Related Art

It is known to use high density, removable media storage libraries within a data storage system to provide large quantities of storage in networked computer systems. Typically, such data storage systems are employed for backup or other secondary storage purposes, but the data storage system may also be used as primary storage in circumstances that are conducive to sequential data access and the like. Often the data is stored on media cartridges, such as magnetic tapes or optical disks, which are arranged in storage bins and accessed when data on a cartridge is requested. Known media cartridges are capable of storing large quantities of data. A storage system may include a plurality of legacy storage devices (i.e., devices which are not specifically designed to work with a more current data storage system.)

One example of a data storage system is a virtual tape server (VTS) system. A VTS system links a plurality of storage devices, both current storage devices and legacy storage devices. Each of these storage devices may be considered a separate component or subsystem. A typical VTS system includes a virtual tape server and an automated media library. In addition to the storage devices the VTS system can include a plurality of consoles for performing various tasks. The library is controlled by a library manager that is similar to a workstation computer.

One known console used within a VTS system is a management and error monitoring console. The management and error monitoring console can include recent program codes and is often installed on a Local Area Network in an existing data center with many existing computer systems (e.g., servers, storage systems, etc.). To manage the various devices on the network (i.e., the various components) the management console generates a list of the devices that it will manage. The list of devices may be in the form of a list of IP addresses of supported systems on the network. To obtain the list of devices, known management consoles use program code version synchronization between the monitoring console and the supported systems such that a common broadcast message or protocol is used for auto discovery. Alternately, address information (such as IP addresses) may be manually provided to the management console for devices that are not capable of responding to the broadcast messages (such as legacy systems).

SUMMARY OF THE INVENTION

In accordance with the present invention, a method for autodiscovery of components on a network without requiring that the components have built-in knowledge of the discovery method is set forth. The method uses a combination of attempting broadcast discovery as well as listening to network traffic. More specifically, a substantially continuously executing program is executed on a management console of the network that performs the broadcast and listening functions. The autodiscovery uses these methods in combination to identify systems that are included within the VTS system.

More specifically, a discovery message is broadcast that is recognized by current or recent revisions of components of the network. The current or recent components know how to respond to the discovery message and therefore can be quickly discovered. Components that respond to the broadcast discovery message are added to an attached systems list and their configuration is requested and stored on the management console.

Additionally, the management console monitors network traffic from unknown IP addresses (i.e., addresses that do not correspond to devices saved within the list of devices) for packets that follow specific patterns. These patterns are defined in a configuration file within the management console. If packets follow a certain pattern, an address is chosen as a candidate for autodiscovery and a request is sent to the system for its configuration information. If the system responds successfully, the address is added to an attached systems list and the configuration is stored on the management console. If the machine responds with an error that indicates that the device does not understand the configuration request, the address of the device is added to a do-not-attach list. If the machine responds with an error that indicates that it understands but cannot currently handle the configuration request, no action is taken.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
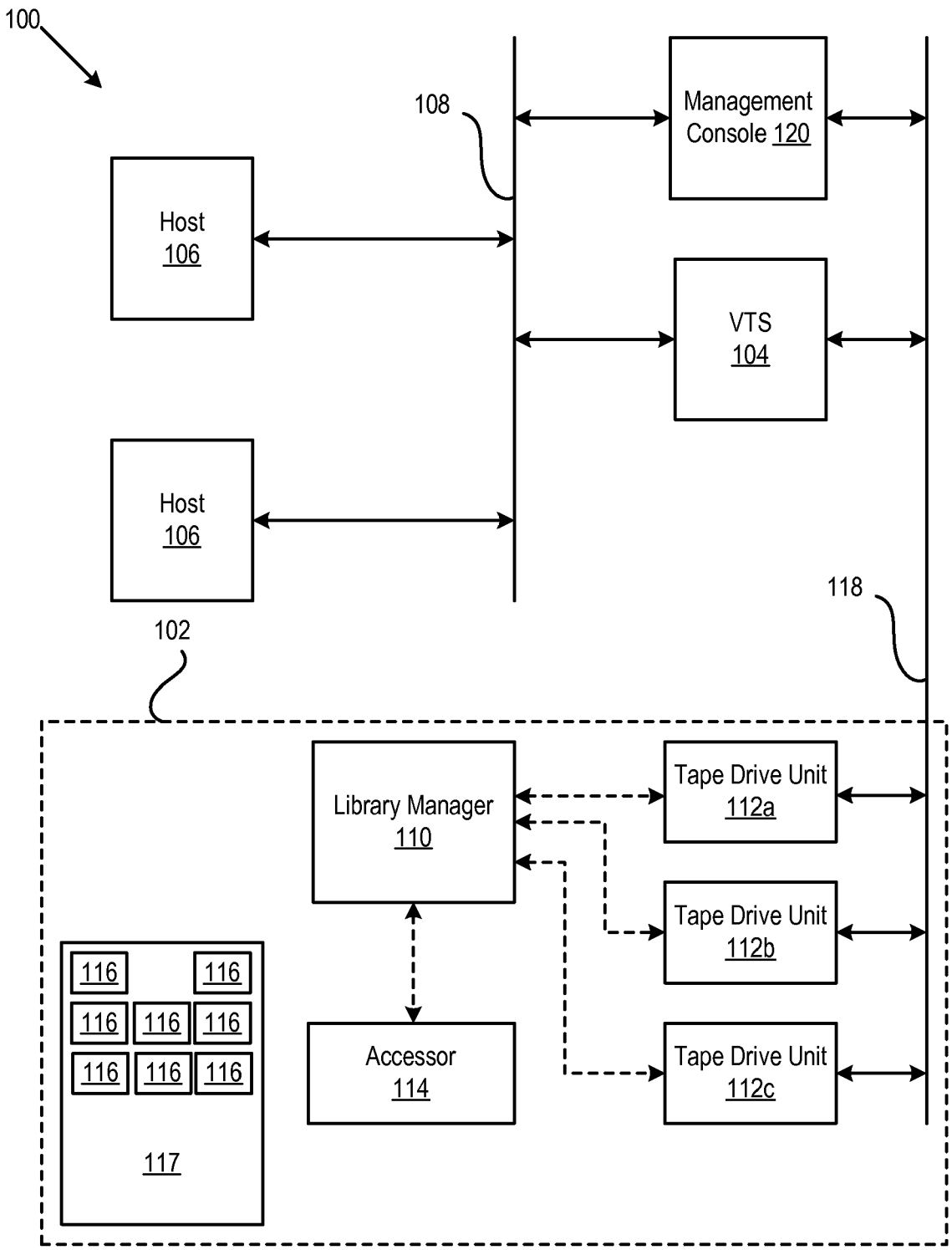
FIG. 1 is a schematic block diagram illustrating a representative virtual tape server system.

FIG. 1 illustrates a schematic block diagram of a representative virtual tape system 100. The system 100 includes at least one automated library unit 102, at least one virtual tape server 104, and at least one host 106. Each host 106 may be a mainframe computer. Alternatively, the host 106 may be a server or personal computer using a variety of operating systems. The host 106 and the virtual tape server 104 are connected via a storage area network (SAN) 108 or similar communications channel.

The automated tape library unit 102 includes a library manager 110, one or more data drive devices, which may be tape drive units 112, an accessor 114, and a plurality of media cartridges 116. The plurality of media cartridges 116 may be stored in one or more media cartridge storage bins 117.

The system 100 also includes a management console 120. The management console 120 may be a server or personal computer using a variety of operating systems.

The library manager 110 is interconnected with, and controls the actions of, the tape drive units 112 and the accessor 114. The library manager 110 typically also includes one or more hard disk drives (not shown) for memory storage, as well as a control panel or keyboard (not shown) to provide user input. The control panel may be a computer in communication with the library manager 110 so that a user can control the operating parameters of the automated tape library unit 102 independently of the host 106.

The automated tape library unit 102 is shown with three tape drive units 112a, 112b, and 112c. The present invention is operable with one or any larger number of tape drive units 112. The tape drive units 112 may share one single repository of cartridges 116. Alternatively, the tape drive units 112 may independently correspond to and utilize multiple repositories of cartridges 116. The tape drive units 112 may be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the virtual tape server 104 and the tape drive units 112 via a network 118, which may be a storage area network (SAN), a local area network (LAN), a wide area network (WAN), or a different type of network, such as the Internet or a direct connection between the virtual tape server 104 and the tape drive devices 112.

The accessor 114 may be a robotic arm or other mechanical device configured to transport a selected cartridge 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 112. The tape drive units 112 may be replaced by optical disk drives or other magnetic drives. Similarly, the cartridges 116 may contain magnetic media, optical media, or any other removable media corresponding to the type of drive employed.

Figure 2:
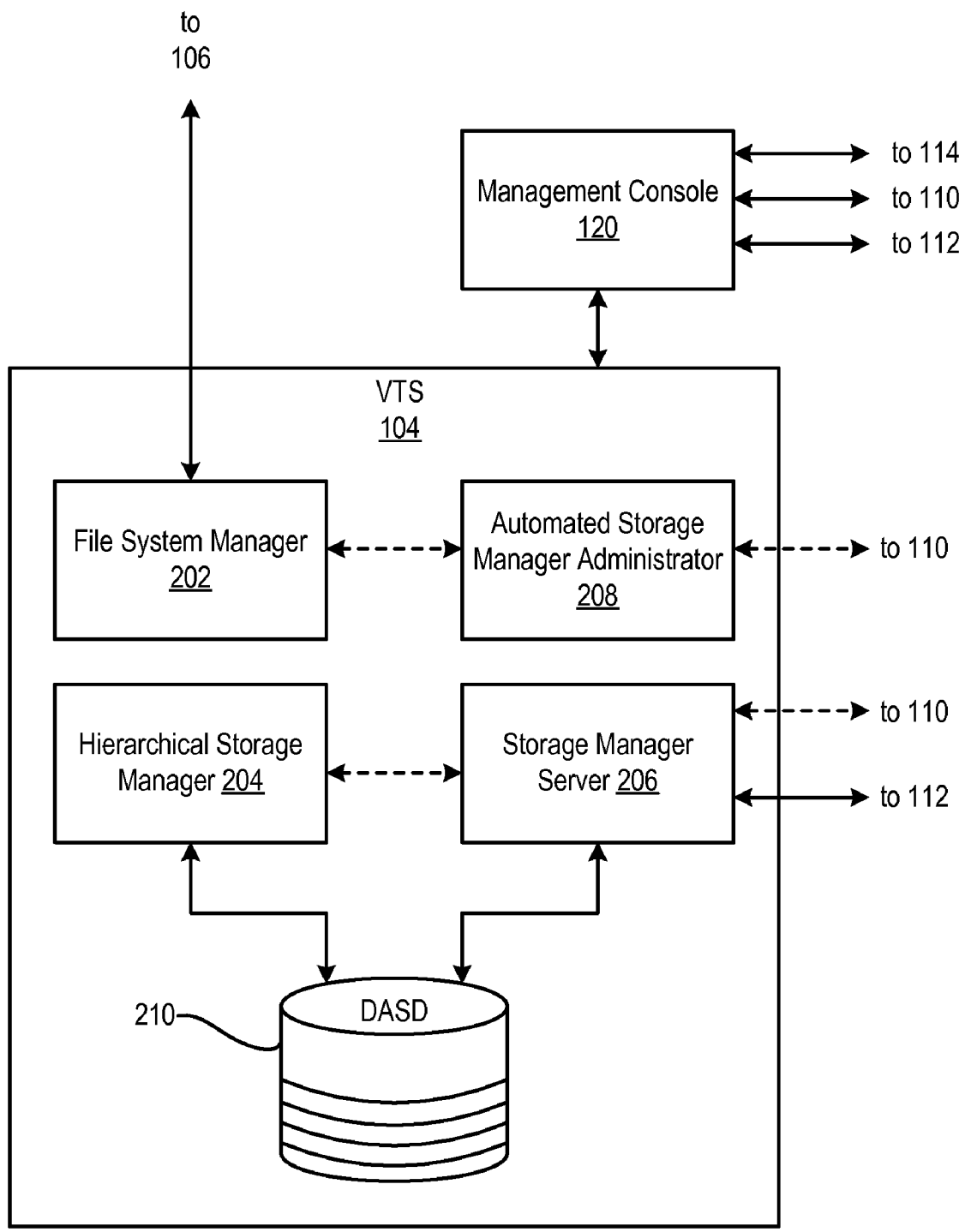
FIG. 2 is a schematic block diagram illustrating a virtual tape server.

FIG. 2 illustrates a schematic block diagram depicting the virtual tape server 104. The virtual tape server 104 may take the form of a computer with a bus, processor, memory, and the like. These elements have been omitted from FIG. 2 to more clearly depict the various executable modules and data blocks of the virtual tape server 104.

As shown, the virtual tape server 104 includes a file system manager 202, a hierarchical storage manager 204, a storage manager server 206, an automated storage manager administrator 208, and at least one direct access storage device (DASD) cache 210. The DASD cache 210 may also be the location where a database for the storage manager server 206 is stored. Other executable modules and data blocks may also be present on the DASD cache 210. The virtual tape server 104 is coupled to the management console 120.

The file system manager 202 handles the actual DASD 210 read and write commands from the host 106 via the hierarchical storage manager 204. The storage manager server 206 controls the interface communications between the DASD 210 and the drive devices 112. The storage manager server 206 is controlled by the automated storage manager administrator 208. The automated storage manager administrator 208 monitors and directs the operation of the file system manager 202, the hierarchical storage manager 204, and the storage manager server 206, and communicates control information to and from the library manager 110.

The management console 120 enables autodiscovery of components coupled to the VTS 104 without requiring that the components have built-in knowledge of the discovery method. The management console uses a combination of attempting broadcast discovery and listening to (or monitoring) network traffic. A substantially continuously executing program is executed on the management console 120 that performs the broadcast and monitoring functions. The autodiscovery uses the broadcast discovery and monitoring in combination to identify components that are included within the VTS system, as well as other devices in a datacenter ororganization.

More specifically, a discovery message is broadcast that is recognized by current or recent revisions of software code for attached components. The components with the current or recent revision of software code know how to respond to the discovery message and therefore can be quickly discovered. Components that respond to the broadcast discovery message are added to an attached systems list and their configuration is requested and stored on the management console 120.

Additionally, the management console 120 monitors network traffic from unknown IP addresses for packets that follow specific patterns. These patterns are defined in a configuration file within the management console 120. If packets follow a certain pattern, an address is chosen as a candidate for autodiscovery and a request is sent to the component corresponding to the IP address for its configuration. If the component responds successfully, the address is added to the attached systems list and the configuration is stored on the management console 120. If the component responds with an error that indicates that the component does not understand the configuration request, the address of the component is added to a do-not-attach list. If the component responds with an error that indicates that it understands but cannot currently handle the configuration request, no action is taken.

The system for autodiscovery with components is implemented as a program executing on the management console 120. The program includes at least two executing threads, a broadcast thread and a listening thread. The broadcast thread periodically executes a broadcast method for autodiscovering systems. The listening thread executes a listening method which monitors traffic passing to its network interface on the subsystem network.

On initialization: the program reads a configuration file which includes packet matching rules for various network protocols into a list F={f_1, f_2, ... ,f_n} of packet matching rules in memory. An example rule list might be:

Protocol=IP, DataMatch={Protocol=TCP, Application=9666, DataMatch={DataPattern="ExecCmd(.*)"}}

Protocol=IP, DataMatch={Protocol=UDP, Application=23, DataMatch={DataPattern="PUT/var/adm/ras/enchosts"}}

The program keeps two lists of addresses, a list of systems attached to the management console and a list of systems to ignore.

The list of systems attached to the management console may be set forth as:

AttachedSystems={a_1, a_2, ... , a_n}

The list of systems to ignore is set forth at

DoNotDisturbSystems={d_1, d_2, ... , d_n}

Figure 3:
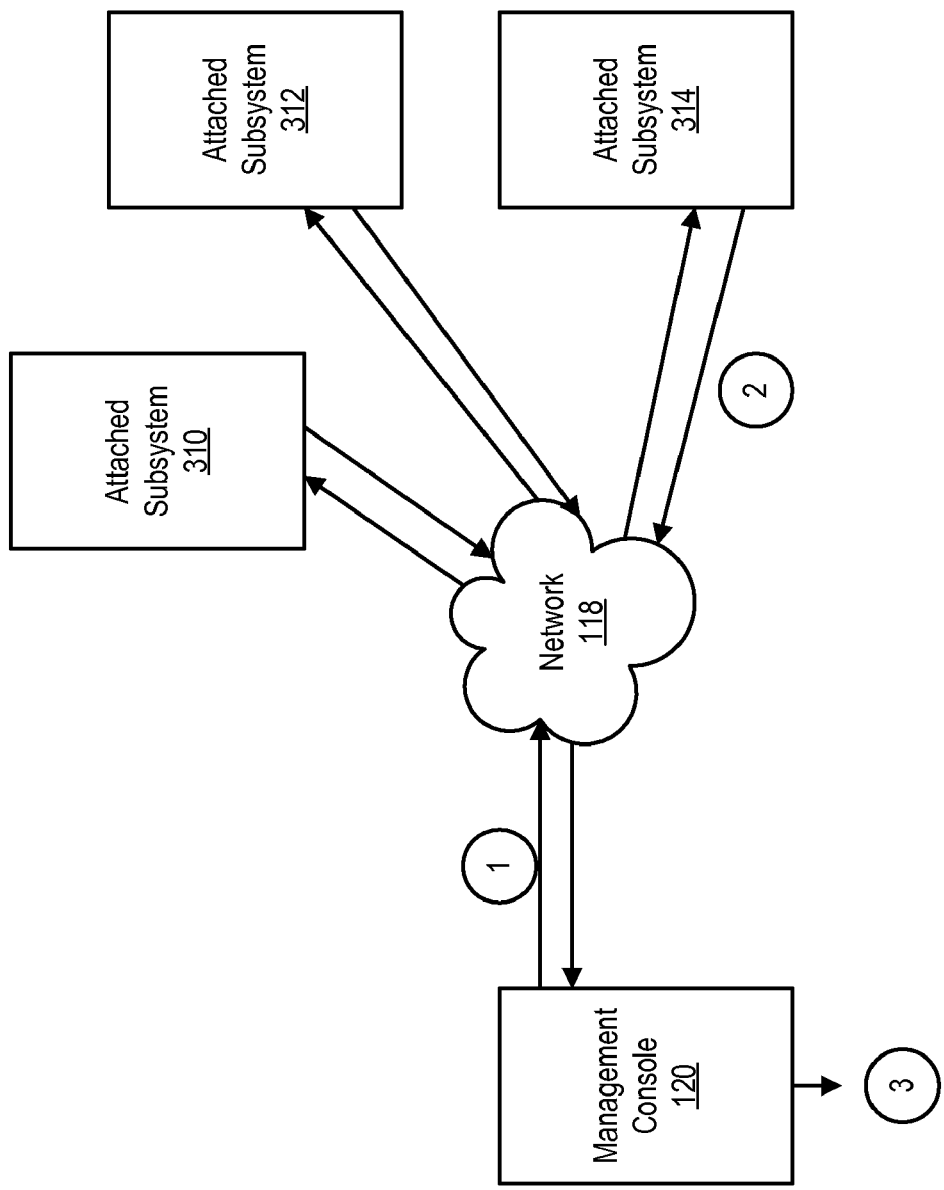
FIG. 3 is a block diagram of a system for using broadcast message protocol to discover subsystems.

Referring to FIG. 3, a block diagram of a system executing the broadcast method for using broadcast message protocol to discover subsystems 310, 312, 314 is shown. More specifically, when using the broadcast message protocol to discover subsystems, a plurality of steps are performed at a regular intervals (e.g., every minute):

First the management console 120 broadcasts a discovery message of a known protocol on the subsystem network. A Service Location Protocol message to discover CIM-enabled devices is an example of one such discovery message. Next the management console 120 listens for responses to the discovery message. The management console might receive a plurality of responses R={r_1, r_2, ..., r_n}. Next for each response r in R, the management console 120 requests configuration information from the source address of response r, and if a valid response is received, adds the configuration information and the address of subsystem that responded with response r to management console. If a invalid response is received, the management console discards the response r.

A valid response is a response that follows the protocol of the specific implementation without errors. An invalid response is a response that exists but does not follow the protocol, such as including unexpected data or data outside of accepted values.

Figure 4:
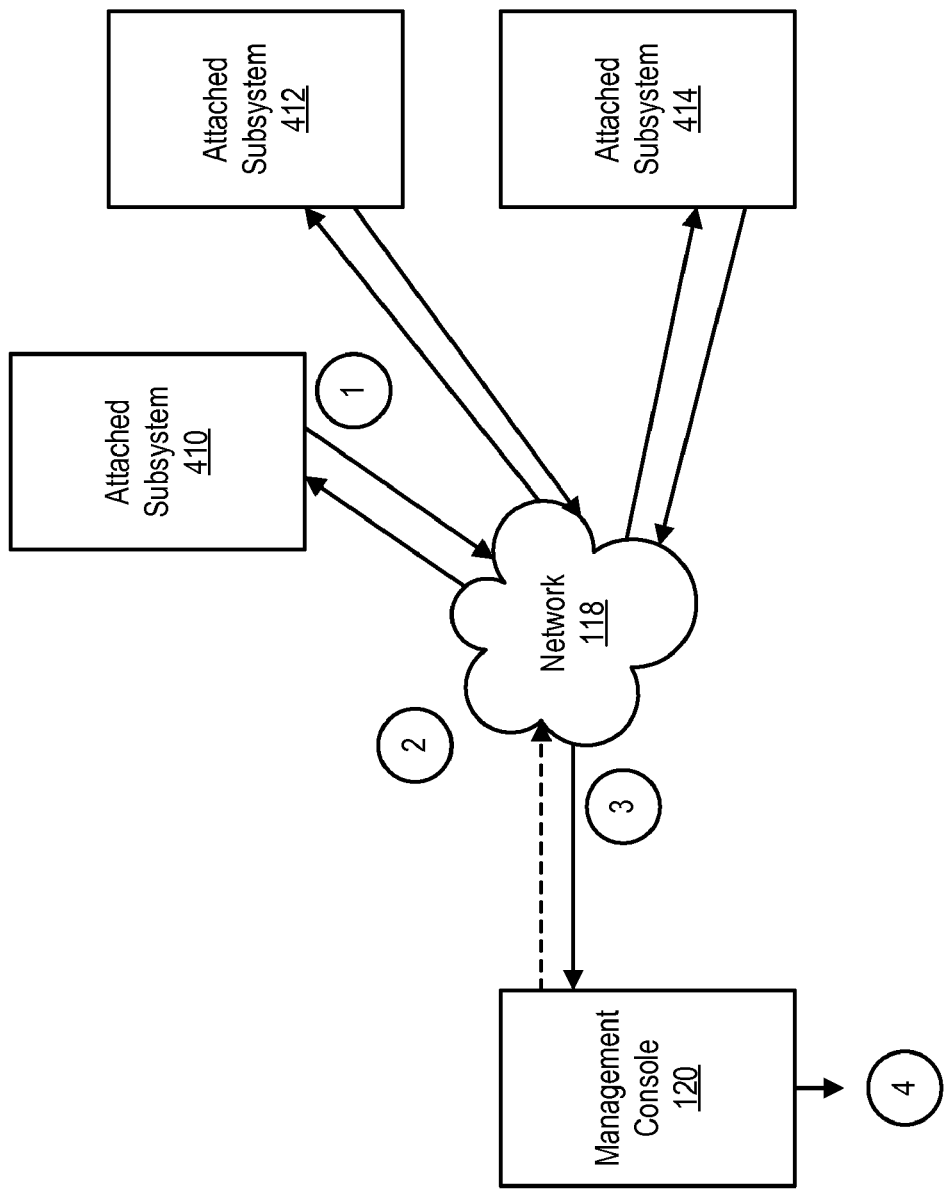
FIG. 4 is a system for using a listening and identifying process to discover subsystems.

Referring to FIG. 4, a system for executing the listening method for using a listening and identifying process to discover subsystems 410, 412, 414 is shown. More specifically, when using the listening and identifying process to discover subsystems, the management console possibly observes a packet P from any address on the network (as indicated by the dashed line). When a packet is received, the management console 120 performs a plurality of operations.

First, the management console examines the source address of packet P. If the source address is already in the list AttachedSystems for this management console 120, then the management console 120 discards the source address for the packet P and continues waiting for packets. If the source address of packet P is in the list DoNotDisturbSystems for this management console 120, then the management console 120 ignores packet P and continues waiting for packets.

For each packet matching rule f in list of rules F, the management console 120 performs a plurality of functions. More specifically, if the data of the packet P matches no rule in the list of rules F, then the management console continues waiting for packets. If the data of the packet P matches a rule f of the list of rules F, then the management console 120 enables the subsystem and begins performing system management functionality on the subsystem that provided the packet. If a valid response is received, then the management console adds the configuration information and the address of subsystem that responded with the response r to management console 120 and returns to waiting for packets. If a response is received that indicates the system at the source address of P does not understand the request, then the management console adds the source address to the list DoNotDisturbSystems and returns to waiting for packets. Examples of "not understanding" the request include responses such as connection failures, refusal or data returned that does not follow an expected format.

If a response is received that indicates the system understands the request but cannot service the request at this time, then the management console does nothing with the packet P and returns to waiting for packets.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the preferred embodiment is described in conjunction with a VTS system, it will be appreciated that such a system can be used within any type of network system in which it is desirable to discover current and legacy components.

Also, for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for performing an auto discovery operation on a network, the network comprising a Virtual Tape Server (VTS) system, the method comprising:

performing a broadcast function, the broadcast function comprising:
broadcasting a discovery message of a known protocol on a network;
monitoring for responses to the discovery message; and
requesting configuration information from each component responding to the discovery message;
for each responding component:
if the responding component responds successfully, then adding the address of the responding component to an attached systems list;
if the responding component responds unsuccessfully, then adding the address of the responding component to a do not attach list; and,
performing a listening function, the listening function comprising:
monitoring the network for communication from unknown addresses having packets that follow specific patterns;
when a communication on the network including packets that follow the specific patterns is identified, identifying an address of an originating component of the communication;

sending a request to the originating component corresponding to the address for configuration information;
if the originating component responds successfully, then adding the address to the attached systems list; and,
if the originating component responds unsuccessfully, then adding the address of the component to the do not attach list.

2. The computer implementable method of claim 1, wherein the listening function further includes:
adding the configuration information and address of a component to a list of known components when a valid response is received; and,
discarding the response when an invalid response is received.

3. The computer implementable method of claim 1, wherein the listening function further includes:
determining whether the communication on the network corresponds to a predefined rule;
if the communication does not correspond to the predefined rule then continuing to monitor the network; and,
if the communication does correspond to the predefined rule, then engaging the originator of the communication and beginning to perform a system management function.

4. The computer implementable method of claim 1, wherein the broadcast function further includes:
if a response to the broadcasting indicates that the component does not understand the requesting configuration information, then associating a do not disturb indication with the component.

5. The computer implementable method of claim 1, wherein the broadcast function further includes:
if a response to the broadcasting indicates that the component understands the requesting configuration information, then adding the configuration information and address of the component to a list of known components.

6. The computer implementable method of claim 1, wherein the network is included within at least one of a storage system, a tape storage system, and a tape library system.

7. The computer implementable method of claim 1, wherein the originator of the communication includes at least one of a tape drive unit, a library manager, an automated tape library unit, and an accessor.

8. A system for performing an auto discovery operation on a network, the network comprising a Virtual Tape Server (VTS) system comprising:
a processor;
a data bus coupled to the processor; and
a computer-usable medium embodying computer program code, the computer-usable medium being coupled to the data bus, the computer program code comprising instructions executable by the processor and configured for:
performing a broadcast function, the broadcast function comprising:
broadcasting a discovery message of a known protocol on a network;
monitoring for responses to the discovery message; and
requesting configuration information from each component responding to the discovery message;
for each responding component:
if the responding component responds successfully, then adding the address of the responding component to an attached systems list;
if the responding component responds unsuccessfully, then adding the address of the responding component to a do not attach list; and,
performing a listening function, the listening function comprising:
monitoring the network for communication from unknown addresses having packets that follow specific patterns;
when a communication on the network including packets that follow the specific patterns is identified, identifying an address of an originating componennt of the communication;
sending a request to originating component corresponding to the address for configuration information;
if the originating component responds successfully, then adding the address to the attached systems list; and,
if the originating component responds unsuccessfully, then adding the address of the component to the do not attach list.

9. The system of claim 8, wherein the broadcast function further includes instructions configured for:
adding the configuration information and address of a component to a list of known components when a valid response is received; and,
discarding the response when a invalid response is received.

10. The system of claim 8, wherein the listening function further includes instructions configured for:
determining whether the communication on the network corresponds to a predefined rule;
if the communication does not correspond to the predefined rule then continuing to monitor the network; and, if the communication does correspond to the predefined rule, then engaging the originator of the communication and beginning to perform a system management function.

11. The system of claim 8, wherein the broadcast function further includes instructions configured for:
if a response to the broadcasting indicates that the component does not understand the requesting configuration information, then associating a do not disturb indication with the component.

12. The system of claim 8, wherein the broadcast function further includes instructions configured for:
if a response to the broadcasting indicates that the component understands the requesting configuration information, then adding the configuration information and address of the component to a list of known components.

13. The system of claim 8, wherein the network is included within at least one of a storage system, a tape storage system, and a tape library system.

14. The system of claim 8, wherein the originator of the communication includes at least one of a tape drive unit, a library manager, an automated tape library unit, and an accessor.

15. A non-transitory computer-usable medium embodying computer program code for performing an auto discovery operation on a network, the network comprising a Virtual Tape Server (VTS) system, the computer program code comprising computer executable instructions configured for:
performing a broadcast function, the broadcast function comprising:
broadcasting a discovery message of a known protocol on a network;

monitoring for responses to the discovery message; and
requesting configuration information from each component responding to the discovery message;
for each responding component:
if the responding component responds successfully, then adding the address of the responding component to an attached systems list:
if the responding component responds unsuccessfully, then adding the address of the responding component to a do not attach list; and,
performing a listening function, the listening function comprising:
monitoring the network for communication from unknown addresses having packets that follow specific patterns;
when a communication on the network including packets that follow the specific patterns is identified, identifying an address of an originating component of the communication;
sending a request to the component corresponding to the address for configuration information;
if the originating component responds successfully, then adding the address to the attached systems list; and,
if the originating component responds unsuccessfully, then adding the address of the component to the do not attach list.

16. The computer-usable medium of claim 15, wherein the embodied computer program code for performing the broadcast function further comprises computer executable instructions configured for:
adding the configuration information and address of a component to a list of known components when a valid response is received; and,
discarding the response when a invalid response is received.

17. The computer-usable medium of claim 15, wherein the embodied computer program code for performing the listening function further comprises computer executable instructions configured for:
determining whether the communication on the network corresponds to a predefined rule;
if the communication does not correspond to the predefined rule then continuing to monitor the network; and,
if the communication does correspond to the predefined rule, then engaging the originator of the communication and beginning to perform a system management function.

18. The computer-usable medium of claim 15, wherein the embodied computer program code for performing the broadcast function further comprises computer executable instructions configured for:
if a response to the broadcasting indicates that the component does not understand the requesting for configuration information, then associating a do not disturb indication with the component.

19. The computer-usable medium of claim 15, wherein the embodied computer program code for performing the broadcast function further comprises computer executable instructions configured for:
if a response to the broadcasting indicates that the component understands the requesting configuration information, then adding the configuration information and address of the component to a list of known components.

20. The computer-usable medium of claim 15, wherein:
the network is included within at least one of a storage system, a tape storage system, and a tape library system.

21. The computer-usable medium of claim 15, wherein:
the originator of the communication includes at least one of a tape drive unit, a library manager, an automated tape library unit, and an accessor.

* * * * *